United States Patent [19]

Miyamoto et al.

[11] Patent Number: 5,068,327

[45] Date of Patent: Nov. 26, 1991

[54] SYMMETRICAL DIOXAZINE COMPOUNDS AND THEIR USE AS FIBER-REACTIVE DYES

[75] Inventors: Tetsuya Miyamoto, Takatsuki; Miyao Takahashi, Minoo; Takahiko Fujisaki, Takarazuka; Shinei Ikeou, Hirakata; Takashi Omura, Kobe, all of Japan

[73] Assignee: Sumitomo Chemical Company, Limited, Osaka, Japan

[21] Appl. No.: 448,644

[22] Filed: Dec. 11, 1989

[30] Foreign Application Priority Data

Dec. 10, 1988 [JP] Japan .................. 63-312656

[51] Int. Cl.$^5$ .......................... C07D 498/00
[52] U.S. Cl. ........................ 544/76; 544/77; 544/337
[58] Field of Search ............ 544/337, 76, 77; 8/455, 8/501, 516, 519, 688

[56] References Cited

U.S. PATENT DOCUMENTS

| | | | |
|---|---|---|---|
| 3,223,470 | 12/1965 | Boedeker et al. | 544/76 |
| 4,780,107 | 10/1988 | Sawamoto et al. | 544/76 |
| 4,785,099 | 11/1988 | Springer et al. | 544/76 |
| 4,841,049 | 6/1989 | Seitz | 544/76 |

FOREIGN PATENT DOCUMENTS

| | | |
|---|---|---|
| 0084718 | 8/1983 | European Pat. Off. . |
| 0158857 | 10/1985 | European Pat. Off. . |
| 0171611 | 2/1986 | European Pat. Off. . |
| 0275022 | 7/1988 | European Pat. Off. . |
| 275022 | 7/1988 | European Pat. Off. .............. 544/76 |
| 60-18359 | 5/1985 | Japan . |
| 62-48768 | 7/1987 | Japan . |
| 1368158 | 9/1974 | United Kingdom . |

OTHER PUBLICATIONS

Science & Industry, vol. 42, No. 11 (1968), pp. 583–594.
Chemical Abstract, vol. 97, No. 2, Jul. 1982, p. 83, Abst. No. 7816 g (JP-A-82 14 654).

Primary Examiner—Jose G. Dees
Assistant Examiner—Deborah D. Carr
Attorney, Agent, or Firm—Stevens, Davis, Miller & Mosher

[57] ABSTRACT

A dioxazine compound represented by the following formula (I) in the free acid form,

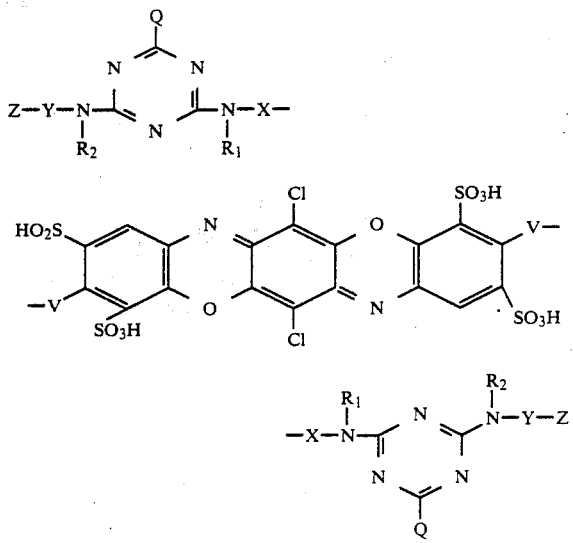

wherein V is a direct linkage or

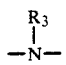

in which $R_3$ is hydrogen or unsubstituted or substituted alkyl, and X is a direct linkage or an aliphatic, araliphatic or aromatic bridging group, provided that X stands for the bridging group as defined hereinabove when V is

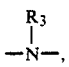

Y is unsubstituted or substituted phenylene, or unsubstituted or substituted naphthylene, Z is $-SO_2CH=CH_2$ or $-SO_2CH_2CH_2Z_1$ in which $Z_1$ is a group capable of being split by the action of an alkali, Q is sulfo, hydroxy, halo, alkoxy, unsubstituted or substituted phenoxy or unsubstituted or substituted amino, and $R_1$ and $R_2$ independently of one another are each hydrogen or unsubstituted or substituted alkyl, which is useful for dyeing or printing fiber materials to give a dyed or printed product of a blue color superior in fastness properties, particularly those such as chlorine fastness, with superior build-up property.

12 Claims, No Drawings

SYMMETRICAL DIOXAZINE COMPOUNDS AND THEIR USE AS FIBER-REACTIVE DYES

The present invention relates to a dioxazine compound, a process for producing the same and a process for dyeing or printing fiber materials with the same. More specifically, the present invention relates to a symmetrical dioxazine compound having two vinylsulfone type fiber-reactive groups, which is useful for dyeing or printing hydroxy or amide group-containing fiber materials, particularly those such as cellulose fibers, natural and synthetic polyamide and polyurethane fibers, leathers and the like, to give dyed or printed products superior in fastness properties such as light fastness, wet fastness, chlorine fastness and the like.

Dioxazine compounds having vinylsulfone type fiber-reactive groups useful for dyeing or printing such fibers are known as disclosed in, for example, European Patent Nos. 275022 and 281799 and Published Unexamined Japanese Patent Application No. 57-14654.

However, these known dioxazine compounds are not yet satisfactory in their dye performance to meet consumers' high demand in recent years. Particularly, the compounds still need to be improved in their fastness properties, particularly those such as chlorine fastness, as well as their dyeing properties such as level-dyeing property, build-up property, dyeing velocity and the like.

The present inventors have undertaken extensive studies to find a dioxazine compound meeting needs as described above, and as a result found a symmetrical dioxazine compound.

The present invention provides a dioxazine compound represented by the following formula (I) in the free acid form,

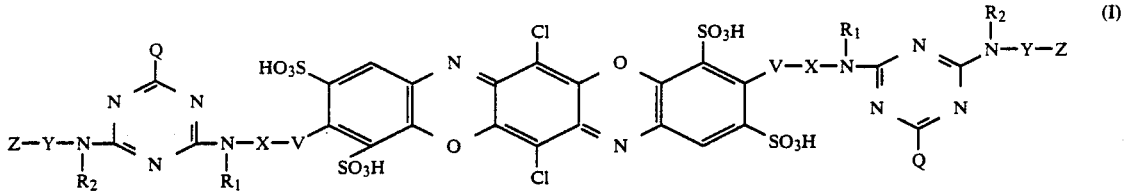

wherein V is a direct linkage or

in which $R_3$ is hydrogen or unsubstituted or substituted alkyl, and X is a direct linkage or an aliphatic, aralihatic or aromatic bridging group, provided that X stands for bridging group as defined hereinabove when V is

Y is unsubstituted or substituted phenylene, or unsubstituted or substituted naphthylene, Z is $-SO_2CH=CH_2$ or $-SO_2CH_2CH_2Z_1$ in which $Z_1$ is a group capable of being split by the action of an alkali, Q is sulfo, hydroxy, halo, alkoxy, unsubstituted or substituted phenoxy or unsubstituted or substituted amino, and $R_1$ and $R_2$ independently of one another are each hydrogen or unsubstituted or substituted alkyl.

The present invention also provides a process for producing the dioxazine compound of the above formula (I), which comprises subjecting a 2,4,6-trihalogeno-s-triazine to condensation with any one of a dioxazine intermediate represented by the following formula (II) in the free acid form,

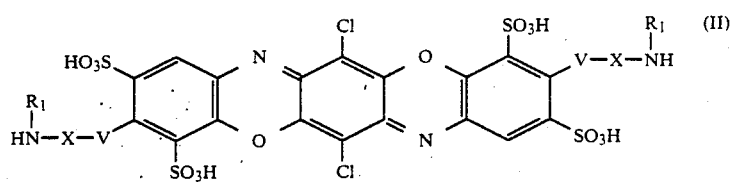

wherein $R_1$, V and X are as defined above, or an amine represented by the following formula, $$\begin{array}{c} R_2 \\ | \\ HN-Y-Z \end{array} \quad (III)$$

wherein $R_2$, Y and Z are as defined above, or if desired, a compound represented by the following formula (IV), $$H-Q_1 \quad (IV)$$

wherein $Q_1$ has the same meanings as Q excepting halo, followed by condensation or condensations with the remaining one or two compounds.

The present invention further provides a process for dyeing or printing fiber materials, which comprises using the dioxazine compound of the formula (I).

With respect to the symbol X in the above formula (I), the aliphatic bridging group may be straight, branched or cyclic, and may be unsubstituted or substituted by sulfo, carboxy, methyl, methoxy or optionally substituted phenyl. Moreover, said aliphatic group may contain a hetero atom in the chain. Examples thereof are as follows:

−(CH₂)₂₋₆—, —CH₂—CH—CH₂—
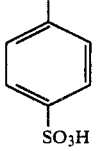

—CH—(CH₂)₁₋₄—,
|
COOH

—CH₂—CH—C₂H₅
        |
        CH₂—CH₂—O—CH₂—CH₂—

—C₂H₄—O—C₂H₄—, —C₂H₄—S—C₂H₄—

—C₂H₄—N—C₂H₄—, 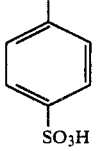
|
COCH₃

The araliphatic bridging group may be unsubstituted or substituted by sulfo, carboxy, methyl, methoxy or optionally substituted phenyl, any may contain a hetero atom in the aliphatic chain. Examples thereof are as follows:

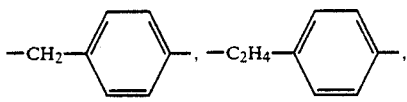

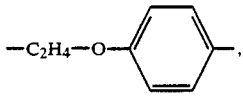

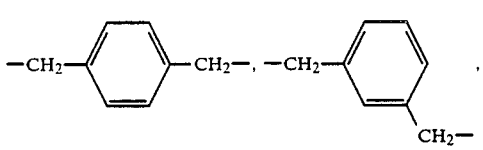

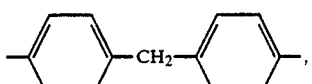

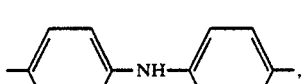

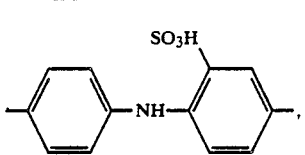

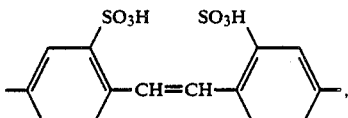

-continued
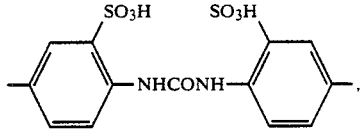

The aromatic bridging group may be unsubstituted or substituted by sulfo, carboxy, methyl, methoxy or optionally substituted phenyl. Examples thereof are as follows:

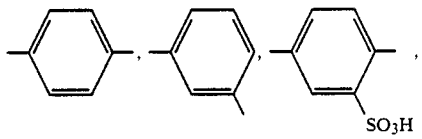

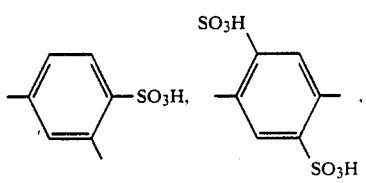

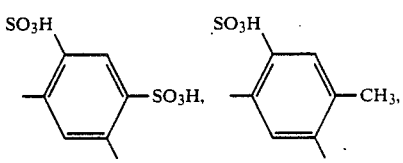

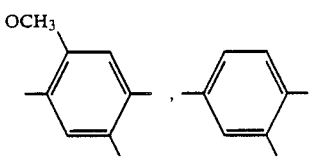

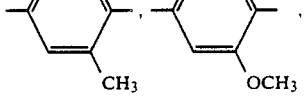

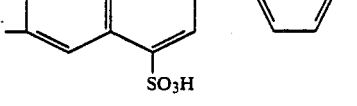

Particularly preferred X includes direct linkage, alkylenes having 2 to 6 carbon atoms, particularly those such as ethylene and propylene, and phenylene unsubstituted or substituted once or twice by sulfo.

With respect to the symbol Q, the halo includes chloro and fluoro, and the alkoxy includes those having 1 to 4 carbon atoms, such as methoxy, ethoxy and the like. The phenoxy may be unsubstituted or substituted once or twice by chloro, bromo, methyl, ethyl, methoxy, ethoxy, sulfo or carboxy. The amino includes amino, alkylamino, N,N dialkylamino, cycloalkylamino, aralkylamino, arylamino and N,N-disubstituted amino such as N,N-dialkylamino, N-alkyl-N-cycloalkyl and N-alkyl-N-arylamino, as well as heterocyclic ring-containing amino which heterocyclic ring may be further addition-condensed with a homocyclic ring, and N-heterocyclic ring-constituting amino which may contain additional hetero atoms (in the present invention, the term "N-heterocyclic ring-constituting amino" is intended to mean such that the nitrogen atom of the amino is a member forming a heterocyclic ring).

In the above definition with respect to the amino, the alkyl is a straight or branched one preferably having 1 to 4 carbon atoms, and preferable examples of the cycloalkyl, aralkyl and aryl are cyclohexyl, benzyl, phenethyl, phenyl and naphthyl, respectively. Examples of the heterocyclic ring are furan, thiophene, pyrazole, pyridine, pirimidine, quinoline, benzimidazol, benzthiazol and benzoxazol. The N-heterocyclic ring constituting amino is preferably a six-membered ring which may contain additional hetero atoms such as nitrogen, oxygen and sulphur. The abovementioned alkyl, cycloalkyl, aralkyl, aryl, heterocyclic ring and N heterocyclic ring may be unsubstituted or substituted with halogen, nitro, cyano, trifluoromethyl, sulfamoyl, carbamoyl, $C_1$–$C_4$ alkyl, $C_1$–$C_4$ alkoxy, acylamino, ureido, hydroxyl, carboxy, sulfomethyl and sulfo.

Preferable examples of the amino represented by Q are —$NH_2$, methylamino, hydroxymethylamino, ethylamino, propylamino, butylamino, hexylamino, β-methoxyethylamino, β-ethoxyethylamino, γ-methoxypropylamino, N,N-dimethylamino, N,N-di-hydroxymethylamino, N,N-diethylamino, β-chloroethylamino, β-cyanoethylamino, N,N-di-β-hydroxyethylamino, β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3-or 4-sulfoanilino, 2,4- or 2,5-disulfoanilino, sulfomethylanilino, N-sulfomethylanilino, 3- or 4-carboxyphenylamino, 2-carboxy-5-sulfophenylamino, 2-carboxyl-4-sulfophenylamino, 2-methoxy-5-sulfophenylamino, 2-methyl-5-sulfophenylamino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, 4,8-disulfonaphthyl-(2)-amino, 3,6,8-trisulfonaphthyl-(2)-amino, 4,6,8-trisulfonaphthyl-(2)-amino, pyridyl-(2)-amino, morpholino, piperidino, piperazino, N-β-hydroxyethyl-N-methylamino, N-ethyl-N-hydroxymethylamino, carboxymethyl-amino, β-carboxyethylamino, β-sulfoethylamino, N-(β-sulfoethyl)-N-methylamino, and the like.

Among those represented by Q, preferred are alkoxy such as methoxy and ethoxy, and unsubstituted or substituted amino such as amino, carboxymethylamino, N,N-dihydroxymethylamino, ethylamino, β-carboxyethylamino, β-hydroxyethylamino, β-methoxyethylamino, β-sulfoethylamino, N-(β-sulfoethyl)-N-methylamino, N,N-diethylamino, N,N-di-β-hydroxyethylamino, phenylamino, N-ethyl-N-phenylamino, toluidino, anisidino, 2-, 3- or 4-sulfoanilino, 2,4- or 2,5-disulfoanilino, 2-carboxy-5-sulfophenylamino, 3,6-disulfonaphthyl-(1)-amino, 3,6,8-trisulfonaphthyl-(1)-amino, 4,8-disulfonaphthyl-(2)-amino, 3,6,8-trisulfonaphthyl-(2)-amino and morpholino.

Of these, particularly preferred are β-sulfoethylamino, phenylamino, N-ethyl-N-phenylamino, 2-, 3- or 4-sulfoanilino, and 2,4- or 2,5-disulfoanilino.

With respect to the symbol Y, the phenylene includes those unsubstituted or substituted once or twice by methyl, ethyl, methoxy, ethoxy, chloro, bromo or sulfo, and the naphthylene includes those unsubstituted or substituted once by sulfo. Preferred examples thereof are as follows;

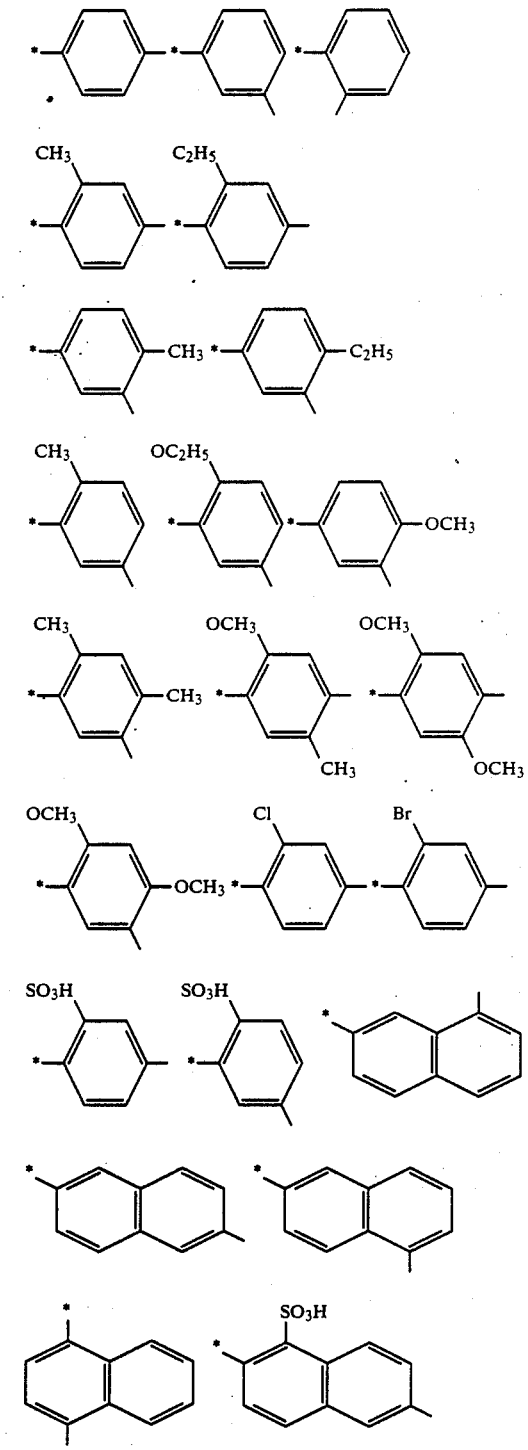

-continued

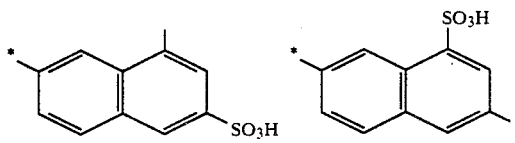

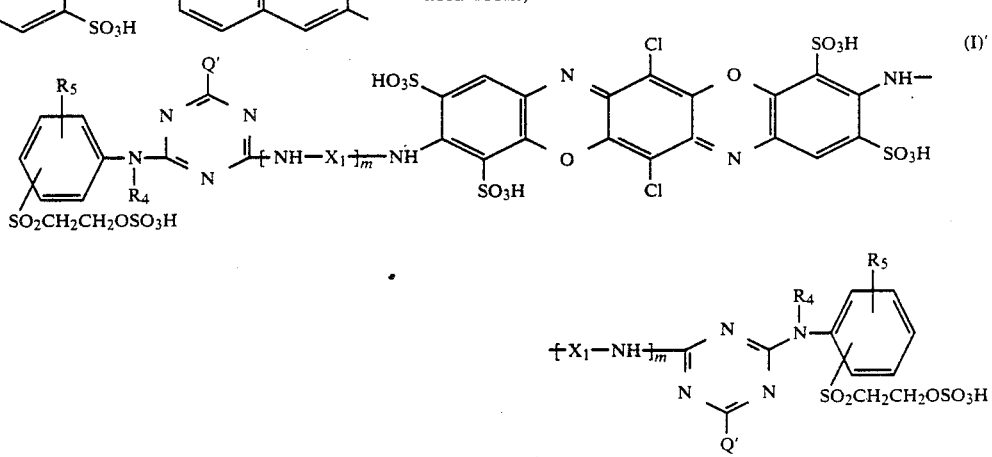

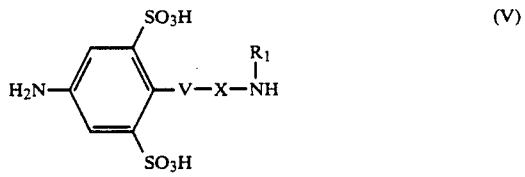

In the above formulas, the asterisked linkage bonds to the group —NR$_2$—.

With respect to the symbol $Z_1$, the group splittable by the action of an alkali includes those well known such as sulfato, thiosulfato, phosphato, acetoxy, halogeno and the like. Of these, particularly preferred is sulfato.

With respect to the symbols $R_1$, $R_2$ and $R_3$, the alkyl is preferably one having 1 to 4 carbon atoms, and is unsubstituted or substituted by hydroxy, cyano, alkoxy, halogeno, carbamoyl, carboxy, alkoxycarbonyl, alkylcarbonyloxy, sulfo or sulfamoyl.

Preferred examples of those represented by $R_1$, $R_2$ and $R_3$, are hydrogen, methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonoyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these, particularly preferred are hydrogen, methyl and ethyl.

Among these dioxazine compounds in accordance with the present invention, particularly preferred is one represented by the following formula (I') in the free acid form, wherein Q' is unsubstituted or substituted amino, $X_1$ is ethylene, propylene or sulfophenylene, $R_4$ is hydrogen, methyl or ethyl, $R_5$ is hydrogen, methyl, methoxy or sulfo, and m is 0 or 1.

The dioxazine compound of the formula (I) may be in the form of a free acid or a salt of an alkali metal or alkaline earth metal. Of these metal salts, preferred are sodium, potassium and lithium salts.

The dioxazine compound of the formula (I) can be produced in the following manner.

The intermediate dioxazine compound of the formula (II), the amine of the formula (III) with or without the compound of the formula (IV) can be subjected to condensation reactions in an optional order with a 1,3,5-trihalogeno-s-triazine, thereby obtaining the desired dioxazine compound of the formula (I).

Although any of the condensation reactions can be carried out under optional reaction conditions and the order of the condensation reactions is not limited, the first condensation ca be preferably carried out at a temperature of —10° to 40° C. and at a pH ranging from 2 to 9, the second condensation at a temperature of 0° to 70° C. and at a pH ranging from 2 to 9, and if any, the third condensation at a temperature of 10° to 100° C. and at a pH ranging from 2 to 7. The order of the condensation reactions can be determined preferably in such a manner that any compound having the lowest reactivity to the 1,3,5-trihalogeno-s-triazine is subjected to first condensation reaction.

The intermediate dioxazine compound of the formula (II) can be readily prepared in a conventional manner, for example, in the following manner.

An aniline compound represented by the following formula (V) in the free acid form, wherein $R_1$, V and X are as defined above, is subjected to condensation with chloranil, thereby obtaining a dianilide represented by the following formula (VI) in the free acid form,

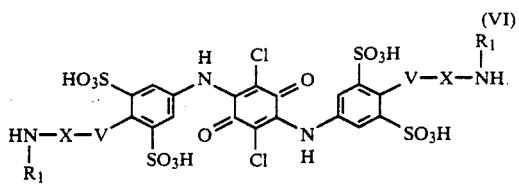

wherein $R_1$, V and X are as defined above. The anilide isolated from the reaction mixture is preferably dried and the subjected to ring closure, if desired, in the presence of an oxydizing agent, thereby obtaining the desired intermediate dioxazine compound of the formula (II).

Alternatively, the intermediate dioxazine compound (II) can be prepared by sulfonating a compound represented by the following formula (VII) in the free acid form,

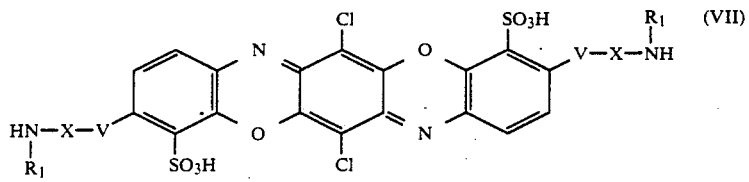

wherein $R_1$, V and X are as defined above, using oleum.

The dioxazine compound (I) in accordance with the present invention is fiber-reactive and useful for dyeing or printing hydroxyl group-containing and amide group-containing materials. The materials are favorably in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural of synthetic polyamide and polyurethane fiber materials can be carried out by performing exhaustion in an acid or weak acid bath, while controlling the pH value, and the making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzene-sulfonic acid or aminonaphthalenesulfonic acid, or an addition product between stearylamine and ethylene oxide, and the like.

The present dioxazine compound (I) can be characterized by excellent dye performances in the dyeing and printing of fiber materials, particularly those such as cellulose fiber materials. For example, the compound can give a dyed or printed product excellent in light fastness, perspiration-light fastness, wet fastness such as washing resistance, peroxide-washing resistance, perspiration resistance and acid-hydrolysis resistance, and alkali fastness, chlorine fastness, abrasion fastness and iron fastness.

The dioxazine compound (I) can also exhibit excellent build-up, level-dyeing and wash-off properties and high solubility as well as high exhaustion and fixation percentages Moreover, the dioxazine compound (I) can hardly be affected by changes in a dyeing temperature and dyeing bath ratio, so that a dyed product with a constant quality can be obtained with superior reproducibility.

Moreover, the dioxazine compound (I) can be characterized in properties such that the compound (I) is hard to change in its quality even when brought into contact with a basic substance during storage, and products dyed or printed with the compound (I) are hard to change in their color even when they are subjected to fix treatment or resin-finishing.

The present invention is illustrated in more detail with reference to the following Examples, which are only illustrative, and in which parts and % are by weight.

EXAMPLE 1

A mixture of a dioxazine intermediate (35 parts) of the following formula,

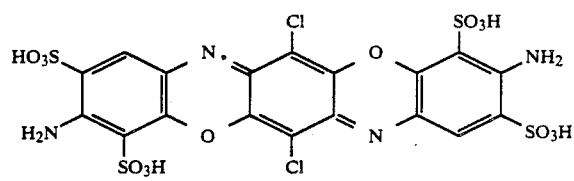

and cyanuric chloride (18 parts) was stirred in water (500 parts) at 0° to 30° C., while keeping the pH within a range of 5 to 8 using sodium carbonate. After completion of the reaction, sulfanilic acid (17 parts) was added thereto, and the mixture was stirred at 10° to 50° C. within a pH of 5 to 8 to complete the reaction. Thereafter, 1-aminobenzene-3-β-sulfatoethylsulfone (28 parts) was added thereto, and the mixture was stirred at 30° to 80° C. within a pH of 3 to 6 to complete the reaction, thereby obtaining a dioxazine compound represented by the following formula in the free acid form.

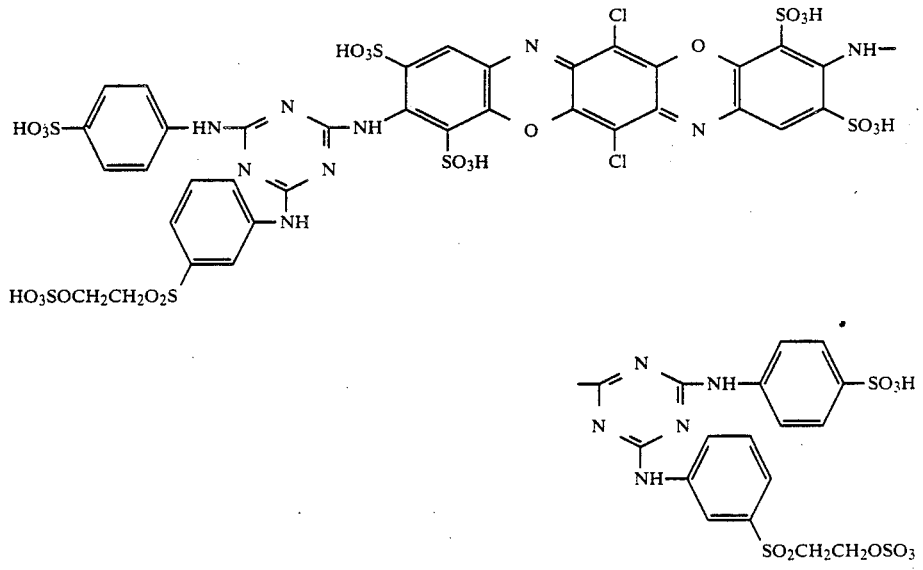

λmax 580 nm in an aqueous medium

The dioxazine intermediate used above was prepared in the following manner.

Into a solution of 1,4-diaminobenzene-2,6-disulfonic acid (26.8 parts) in water (500 parts) was added chloranil (12.3 parts), and the mixture was stirred at 30° to 80° C. within a pH of 4 to 7 to complete the reaction. Thereafter, isolation by salting out using sodium chloride gave a dianilide compound of the formula corresponding to the aforementioned formula (VI).

The dianilide compound was added to 5 to 30% oleum (500 parts), and the mixture was stirred at 10° to ° C. After completion of the reaction, the reaction mixture was poured into ice water, followed by salting out using sodium chloride. Thus, the desired dioxazine intermediate was obtained.

Alternatively, the dioxazine intermediate can be obtained by adding the dianilide obtained above in 5 to 30% oleum and stirring the mixture at 0° to 40° C. in the presence of potassium iodide (1 part).

Further, a mixture of a compound (28 parts) represented by the following formula in the free acid form,

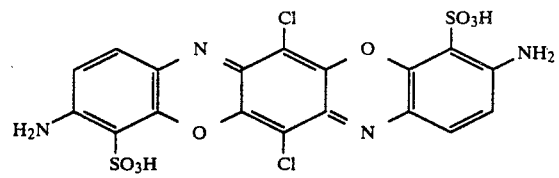

and 10 to 30% oleum can be stirred at 50° to 100° C. to obtain the desired dioxazine intermediate.

EXAMPLE 2

The dioxazine compound obtained in Example 1 (each of 0.1, 0.3 and 0.6 parts) was dissolved in water (200 parts) to prepare each dye bath. Sodium sulfate (10 parts) and cotton (10 parts) were added to the bath, and the bath was heated to 60° C. Sodium carbonate (4 parts) was added thereto, and dyeing was continued for 1 hour at that temperature. Thereafter cotton taken out was washed with water, soaped, again washed with water and then dried to obtain each dyed product of a reddish blue color superior in fastness properties. The buildup property was found to be superior.

EXAMPLES 3 to 22

Example 1 was repeated, provided that the dioxazine intermediate and 1-aminobenzene-3-$\beta$-sulfatoethylsulfone were replaced by those shown in columns I and II of the following table, respectively, thereby obtaining a corresponding dioxazine compound. A color shade obtained by dyeing cotton using the dioxazine compound was as shown in the column III.

| Example No | I | II | III |
|---|---|---|---|
| 3 | [tetrasulfonated dichloro dioxazine core with NH₂ and SO₃H groups] | 4-aminophenyl-SO₂C₂H₄OSO₃H | Reddish blue |
| 4 | " | 4-amino-2-(SO₂C₂H₄OSO₃H)-anisole | " |
| 5 | " | 6-amino-2-(SO₂C₂H₄OSO₃H)-naphthalene | " |
| 6 | " | 3-amino-4-methoxyphenyl-SO₂C₂H₄OSO₃H | " |
| 7 | [tetrasulfonated dichloro dioxazine core with NH₂ and SO₃H groups] | 3-amino-4-sulfophenyl-SO₂C₂H₄OSO₃H | Reddish blue |
| 8 | " | 2-amino-1-sulfo-5-(SO₂C₂H₄OSO₃H)-naphthalene | " |

-continued

| Example No | I | II | III |
|---|---|---|---|
| 9 | triphenodioxazine core (Cl, SO₃H, NH₂, SO₃H substituents) | 4-(C₂H₅-HN-)-C₆H₄-SO₂C₂H₄OSO₃H | " |
| 10 | " | 3-(C₂H₅-HN-)-C₆H₄-SO₂C₂H₄OSO₃H | " |
| 11 | " | 4-H₂N-3-SO₃H-C₆H₃-SO₂CH₂CH₂OSO₃H | Reddish blue |
| 12 | " | 3-H₂N-C₆H₄-SO₂CH=CH₂ | " |
| 13 | " | 4-H₂N-C₆H₄-SO₂C₂H₄OSO₃H | " |
| 14 | " | 4-H₂N-C₆H₄-SO₂C₂H₄OPO₃H₂ | " |
| 15 | triphenodioxazine core (Cl, SO₃H, NH₂, SO₃H substituents) | naphthalene with SO₃H, H₂N, SO₂CH=CH₂ | Reddish blue |

-continued

| Example No | I | II | III |
|---|---|---|---|
| 16 | (structure) | (structure with SO₂C₂H₄OSO₃H, H₂N on benzene) | " |
| 17 | (structure) | (naphthalene with SO₃H, H₂N, SO₂C₂H₄OSO₃H) | Blue |
| 18 | (structure) | (benzene with H₂N, SO₂C₂H₄OSO₃H) | " |
| 19 | (structure) | (benzene with C₂H₅HN, SO₂C₂H₄OSO₃H) | Blue |
| 20 | " | (benzene with H₂N, SO₂C₂H₄OSO₃H) | " |
| 21 | (structure) | (naphthalene with H₂N, SO₂C₂H₄SO₃H) | Reddish blue |

-continued

| Example No | I | II | III |
|---|---|---|---|
| 22 | " | (4-aminophenyl)-SO₂C₂H₄OSO₃H | " |
| 22-1 | (complex phenoxazine structure with Cl, SO₃H, NH, NH₂ groups) | 2-amino-1-SO₃H-5-(SO₂C₂H₄OSO₃H) naphthalene | Reddish blue |
| 22-2 | " | (4-aminophenyl)-SO₂C₂H₄OSO₃H | " |
| 22-3 | " | (3-aminophenyl)-SO₂C₂H₄OSO₃H | " |
| 22-4 | " | 2-amino-4-(SO₂CH₂CH₂OSO₃H)-1-SO₃H benzene | " |
| 22-5 | " | (3-aminophenyl)-SO₂CH=CH₂ | Reddish blue |

-continued

| Example No | I | II | III |
|---|---|---|---|
| 22-6 | [structure: dioxazine core with Cl, N, O, SO₃H substituents and anilino groups bearing NH₂ and SO₃H] | [structure: naphthalene with SO₃H, NH₂, and SO₂C₂H₄OSO₃H] | " |
| 22-7 | " | [structure: 4-aminobenzene with SO₂C₂H₄OSO₃H] | " |
| 22-8 | " | [structure: 3-aminobenzene with SO₂C₂H₄OSO₃H] | " |
| 22-9 | " | [structure: aminobenzene with SO₂CH₂CH₂OSO₃H and SO₃H] | Reddish Blue |
| 22-10 | " | [structure: 3-aminobenzene with SO₂CH=CH₂] | " |

EXAMPLE 23

Example 1 was repeated, provided that the sulfanilic acid used in Example 1 was replaced by orthanilic acid, metanilic acid, 1-aminonaphthalene-3,6-disulfonic acid, 1-aminonaphthalene-4,6,8-trisulfonic acid, 2-aminonaphthalene-4,8-disulfonic acid, 2-aminonaphthalene-3,6,8-trisulfonic acid, aniline-2,5-disulfonic acid, aniline, m-toluidine, o-anisidine, ammonia, ethylamine, ethanolamine, β-alanine, taurine and N-methyltaurine, respectively, thereby obtaining a corresponding dioxazine compound.

EXAMPLE 24

Each of Examples 2 to 22 was repeated, provided that the sulfanilic acid was replaced by respective amines used in Example 23, thereby obtaining a corresponding dioxazine compound.

EXAMPLE 25

Each dioxazine compound obtained in Examples 3 to 24 (each of 0.1, 0.3 and 0.6 parts) was dissolved respectively in water (200 parts) to prepare each dye bath. Sodium sulfate (10 parts) and cotton (10 parts) were added thereto. The bath was heated to 60° C., and then sodium carbonate (4 parts) was added thereto. Dyeing was continued for 1 hour at that temperature. Thereafter, the cotton taken out was washed with water, soaped, again washed with water and then dried to obtain each dyed product of a blue color superior in fastness properties. The build-up property was found to be supeior.

EXAMPLE 26

Example 1 was repeated, provided that the sulfanilic acid and 1-aminobenzene-3-β-sulfatoethylsulfone to be subjected to condensation reaction were exchanged in the reaction order, thereby obtaining the same dioxazine compound as in Example 1.

EXAMPLE 27

Aniline-2,5-disulfonic acid (51 parts) was dissolved in water (500 parts), while sodium carbonate being added to perform neutralization. To this solution was added cyanuric chloride (37 parts) at 5° to 30° C., and the mixture was stirred at that temperature to complete the reaction. The dioxazine intermediate compound of the following formula (79 parts),

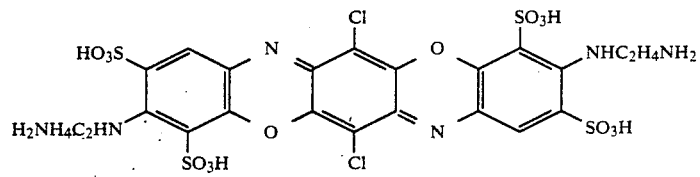

which had been obtained in the same manner as in Example 1, was added to the above reaction mixture, and the resulting mixture was allowed to react each other, while sodium carbonate being added to perform neutralization After completion of the reaction, 1-aminobenzene-3-βsulfatoethylsulfone (56 parts) was added thereto, and the mixture was heated to 50° to 90° C., while sodium carbonate being added to neutralize the hydrochloric acid liberated Completion of the reaction gave a dioxazine compound represented by the following formula in the free acid form.

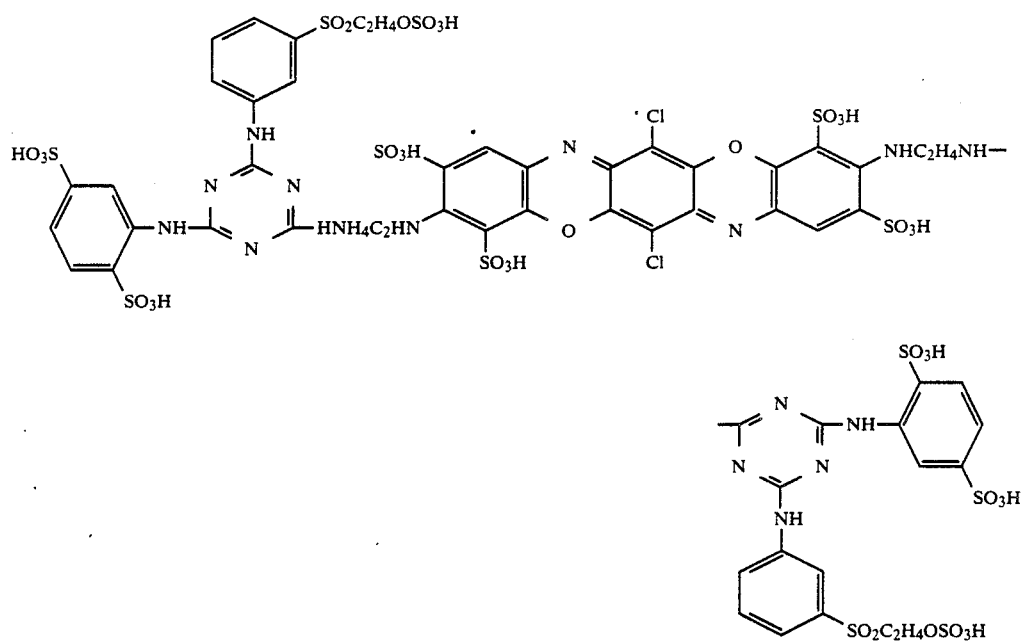

λmax 630 nm in an aqueous medium

EXAMPLES 28 to 43

Example 1 was repeated, provided that the dioxazine intermediate, sulfanilic acid and 1-aminobenzene-3-β-sulfatoethylsulfone were replaced by those shown in columns I to III, respectively, thereby obtaining a corresponding dioxazine compound. A color shade obtained by dyeing cotton using the dioxazine compound was as shown in the column IV.

The dioxazine compound can also be obtained in the manner described in Example 26 or in Example 27 using those shown in the columns II and III in place of the aniline-2,5-disulfonic acid and 1-aminobenzne-3-β-sulfatoethylsulfone, respectively.

| Example No | I | II | III | IV |
|---|---|---|---|---|
| 28 | (structure with chloranil core, two aminosulfonic aryl groups) | morpholine (HN-morpholine) | 3-aminophenyl-SO₂C₂H₄OSO₃H | Reddish blue |
| 29 | " | " | 4-aminophenyl-SO₂C₂H₄OSO₃H | Reddish blue |
| 30 | " | NH(C₂H₄OH)₂ | 4-(C₂H₅NH)phenyl-SO₂C₂H₄OSO₃H | Reddish blue |
| 31 | " | 2-amino-1,4-benzenedisulfonic acid | 2,5-dimethoxy-4-aminophenyl-SO₂C₂H₄OSO₃H | Reddish blue |
| 32 | (larger bis-chloranil structure with two anilino-sulfonic substituents) | 4-amino-1,3-benzenedisulfonic acid | 4-aminophenyl-SO₂C₂H₄OSO₃H | Reddish blue |
| 33 | " | NH(C₂H₅)₂ | 4-(C₂H₅NH)phenyl-SO₂C₂H₄OSO₃H | Reddish blue |

-continued

| Example No | I | II | III | IV |
|---|---|---|---|---|
| 34 | " | 2-amino-naphthalene-5,8-disulfonic acid (H₂N-naphthalene with SO₃H at 5,8) | 4-amino-2,5-dimethoxyphenyl with SO₂C₂H₄OSO₃H (HN-C₆H₂(OCH₃)₂-SO₂C₂H₄OSO₃H) | Reddish blue |
| 35 | " | N-ethylaniline (C₂H₅(H₂N)-C₆H₅) | 4-amino-3-sulfophenyl-SO₂C₂H₄OSO₃H (HN-C₆H₃(SO₃H)-SO₂C₂H₄OSO₃H) | Reddish blue |
| 36 | Structure: central quinone ring with Cl substituents, linked via O and N bridges to two sulfonated aminoaryl groups (SO₃H, NHC₂H₄NH₂, H₂NH₄C₂HN, HO₃S) | morpholine (O-CH₂CH₂-NH-CH₂CH₂) | 3-(N-ethylamino)phenyl-SO₂C₂H₄OSO₃H (C₂H₅-HN-C₆H₄-SO₂C₂H₄OSO₃H) | Reddish blue |
| 37 | " | NH(C₂H₄OH)₂ | 6-amino-2-naphthyl-SO₂C₂H₄OSO₃H (H₂N-naphthalene-SO₂C₂H₄OSO₃H) | Reddish blue |
| 38 | " | 2-amino-1,4-benzenedisulfonic acid (SO₃H, H₂N, SO₃H on benzene) | " | Reddish blue |
| 39 | " | H₂NCH₂COOH | 4-aminophenyl vinylsulfone (H₂N-C₆H₄-SO₂CH=CH₂) | Reddish blue |

-continued

| Example No | I | II | III | IV |
|---|---|---|---|---|
| 40 | [structure: dichloro-dioxazine core with sulfonated aminophenyl groups bearing NHC₃H₆NH₂ substituents] | $H_2NC_2H_4OCH_3$ | [structure: 2-chloro-4-($SO_2C_2H_4OSO_3H$)aniline] | Blue |
| 41 | " | [structure: 4-aminobenzenesulfonic acid ($H_2N$-C₆H₄-$SO_3H$)] | [structure: 3-$SO_3H$-4-amino-phenyl-$SO_2C_2H_4OSO_3H$] | Blue |
| 42 | " | [structure: 2-amino-1,4-benzenedisulfonic acid] | [structure: 4-amino-phenyl-$SO_2C_2H_4OSO_3H$] | Blue |
| 43 | " | [structure: 2-amino-4-$SO_3H$-benzoic acid (COOH)] | " | Blue |
| 43-1 | [structure: larger dichloro-dioxazine with multiple sulfonated aryl amine substituents] | [structure: 2-amino-1,4-benzenedisulfonic acid] | [structure: 4-amino-phenyl-$SO_2C_2H_4OSO_3H$] | Reddish blue |

| Example No | I | II | III | IV |
|---|---|---|---|---|
| 43-2 | " | 2,5-disulfo aniline (H₂N-C₆H₃(SO₃H)₂, SO₃H at 1,4 positions relative) | 3-aminophenyl-SO₂C₂H₄OSO₃H | Reddish blue |
| 43-3 | " | 2-amino-naphthalene-5,8-disulfonic acid | 4-amino-2,5-dimethoxyphenyl-SO₂C₂H₄OSO₃H | Reddish blue |
| 43-4 | " | N-ethylaniline (C₆H₅-NH-C₂H₅) | 4-amino-3-sulfophenyl-SO₂C₂H₄OSO₃H | Reddish blue |
| 43-5 | " | 4-amino-2,5-disulfo aniline (H₂N-C₆H₂(SO₃H)₂ with SO₃H ortho and meta) | 4-aminophenyl-SO₂C₂H₄OSO₃H | Reddish blue |
| 43-6 | " | 2-amino-1,4-disulfobenzene with bridged dianiline-chloranil structure (complex bis-aminoaryl chloranil linker: H₂N-C₆H₃(SO₃H)-NH-C₆H₂(SO₃H)₂-O-C₆Cl₂(=N-)₂-O-C₆H₂(SO₃H)-NH-C₆H₃(SO₃H)-NH₂ with additional SO₃H and NH₂ substituents) | 3-aminophenyl-SO₂C₂H₄OSO₃H | Reddish blue |

| Example No | I | II | III | IV |
|---|---|---|---|---|
| 43-7 | " | 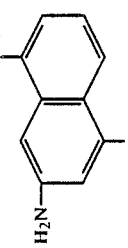 | 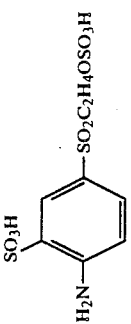 | Reddish blue |
| 43-8 | " | 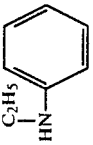 |  | Reddish blue |

EXAMPLE 44

Each dioxazine compound obtained in Examples 27 to 43 (each of 0.1, 0.3 and 0.6 parts) was dissolved in water (200 parts), and sodium sulfate (10 parts) and cotton (10 parts) were added thereto. The bath was heated to 60° C. and then sodium carbonate (4 parts) was added thereto. Thereafter, dyeing was continued for 1 hour at that temperature. The cotton taken out was washed with water, soaped, again washed with water and then dried to obtain each dyed product of a blue color superior in fastness properties. Each dioxazine compound was found to be superior in build-up property.

EXAMPLE 45

2-Methoxy-4,6-dichloro-s-triazine (36 parts) and the same intermediate dioxazine compound (54.5 parts) as that in Example 1 were subjected to condensation reaction with each other in a manner similar to that of Example 27, followed by condensation reaction with 1-aminobenzene-3-β-sulfatoethylsulfone (56 parts), and thereafter salting-out gave a dioxazine compound represented by the following formula in the free acid form.

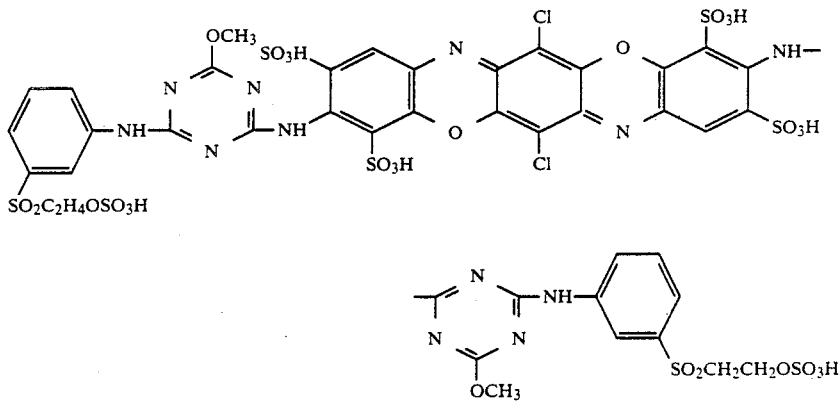

EXAMPLES 46 to 57

Example 45 was repeated, provided that the dioxazine intermetdiate, 2-methoxy-4,6-dichloro-s-triazine and 1-aminobenzene-3-β-sulfatoethylsulfone were replaced by those shown in columns I to III of the following table, thereby obtaining a corresponding dioxazine compound. In the column II, the alkoxy moiety only is shown for the 2-alkoxy-4,6-dichloro-s-triazine used. A color shade obtained by dyeing cotton using the dioxazine compound was as shown in the column IV.

| Example No | I | II | III | IV |
|---|---|---|---|---|
| 46 | [trisazo/oxazine chromophore with Cl, SO₃H, NH₂, O, N substituents] | —OCH₃ | [2-amino-1-naphthol-6-sulfonate with SO₂C₂H₄OSO₃H and SO₃H] | Reddish blue |
| 47 | " | " | [4-aminoanisole with SO₂CH=CH₂ and OCH₃] | " |
| 48 | " | " | [2-amino-naphthalene with SO₂C₂H₄OSO₃H] | " |
| 49 | " | —OC₂H₅ | [aniline with SO₃H and SO₂C₂H₄OSO₃H] | " |
| 50 | [same oxazine chromophore] | —OCH₃ | [N-ethylaniline with SO₂C₂H₄OSO₃H] | Reddish blue |
| 51 | " | " | [N-ethylaniline with SO₂C₂H₄OSO₃H, meta] | " |

| Example No | I | II | III | IV |
|---|---|---|---|---|
| 52 | triphenodioxazine with Cl, Cl, SO₃H, SO₃H, NH-(C₆H₃(SO₃H)(NH₂)) groups | " | H₂N–C₆H₄–SO₂C₂H₄OSO₃H (meta) | " |
| 53 | triphenodioxazine with Cl, Cl, SO₃H, SO₃H, C₂H₄NH₂, H₂NH₄C₂ groups | " | H₂N–C₆H₄–SO₂C₂H₄OSO₃H (para) | Blue |
| 54 | triphenodioxazine with Cl, Cl, SO₃H, SO₃H, NHC₂H₄NH₂, H₂NH₄C₂HN groups | –OCH₃ | aminonaphthalene-SO₃H, SO₂C₂H₄OSO₃H | Blue |
| 55 | " | " | H₂N–C₆H₃(SO₃H)–SO₂C₂H₄OSO₃H | " |
| 56 | " | " | H₂N–C₆H₃(OCH₃)–SO₂C₂H₄OSO₃H | " |
| 57 | triphenodioxazine with Cl, Cl, SO₃H, HO₃S, NHC₃H₆NH₂, H₂NH₆C₃HN groups | " | H₂N–C₆H₃(Br)–SO₂C₂H₄OSO₃H | " |

-continued

| Example No | I | II | III | IV |
|---|---|---|---|---|
| 57-1 | [phenoxazine dye structure with Cl, SO₃H, NH, cyclohexane-diamine-disulfonic acid, and aminobenzenesulfonic acid substituents] | —OCH₃ | [2-amino-1-sulfo-6-(β-sulfatoethylsulfonyl)naphthalene] | Reddish blue |
| 57-2 | " | " | [3-amino-(β-sulfatoethylsulfonyl)benzene] | " |
| 57-3 | " | " | [4-amino-(β-sulfatoethylsulfonyl)benzene] | " |
| 57-4 | " | —OC₂H₅ | [2-amino-3-sulfo-5-(β-sulfatoethylsulfonyl)benzene] | " |
| 57-5 | [phenoxazine dye structure with Cl, SO₃H, NH, aminobenzenedisulfonic acid substituents] | —OCH₃ | [2-amino-1-sulfo-5-(β-sulfatoethylsulfonyl)naphthalene] | Reddish blue |

-continued
| Example No | I | II | III | IV |
|---|---|---|---|---|
| 57-6 | " | " | 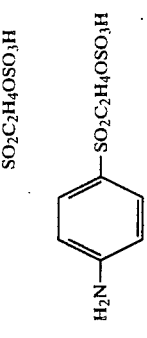 | " |
| 57-7 | " | " | 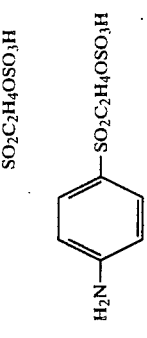 | " |
| 57-8 | " | —OC₂H₅ | 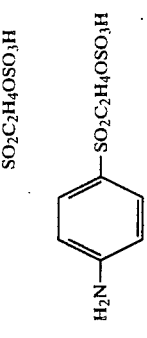 | " |

EXAMPLE 58

Each dioxazine compound obtained in Examples 45 to 57 (each of 0.1, 0.3 and 0.6 parts) was dissolved in water (200 parts), and sodium sulfate (10 parts) and cotton(10 parts) were added thereto. The bath was heated to 60° C. and then sodium carbonate (4 parts) was added thereto. Thereafter, dyeing was continued for 1 hour at that temperature. The cotton taken out was washed with water, soaped, again washed with water and then dried to obtain each dyed product of a blue color superior in fastness properties. Each dioxazine compound was found to be superior in build-up property.

EXAMPLE 59

| Composition of color paste | |
|---|---|
| Dioxazine compound obtained in Example 1 | 5 parts |
| Urea | 5 parts |
| Sodium alginate (5%) stock paste | 50 parts |
| Hot water | 25 parts |
| Sodium hydrogencarbonate | 2 parts |
| Balance (water) | 13 parts |

Mercerized cotton broad cloth was printed with the color paste having the above composition, pre-dried and steamed at 100° C. for 5 minutes. The treated cloth was washed with hot water, soaped, again washed with hot water and then dried. Thus, there was obtained a printed product of a blue color excellent in fastness properties.

We claim:

1. A process of dyeing or printing comprising the application of a dioxazine compound represented by the following formula in the free acid form.

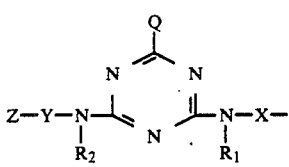

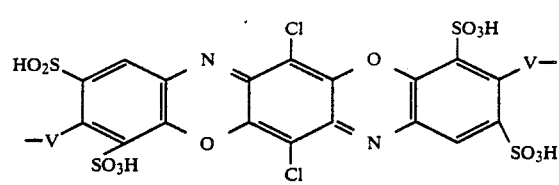

-continued

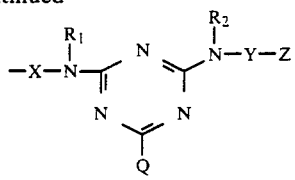

wherein V is a direct linkage or

in which $R_3$ is hydrogen or unsubstituted or substituted alkyl, and X is a direct linkage or an aliphatic, araliphatic or aromatic bridging group, provided that X stands for the bridging group as defined hereinabove when V is

Y is unsubstituted or substituted phenylene, or unsubstituted or substituted naphthylene, Z is —$SO_2CH=CH_2$ or —$SO_2CH_2CH_2Z_1$ in which $Z_1$ is a group capable of being split by the action of an alkali, Q is sulfo, hydroxy, halo, alkoxy, unsubstituted or substituted phenoxy or unsubstituted or substituted amino, and $R_1$ and $R_2$ independently of one another are each hydrogen or unsubstituted or substituted alkyl, in which the material being dyed or printed contains hydroxy or amide groups.

2. Hydroxy group- or amide group-containing materials dyed by the process of claim 1.

3. A dioxazine compound represented by the following formula (I) in the free acid form,

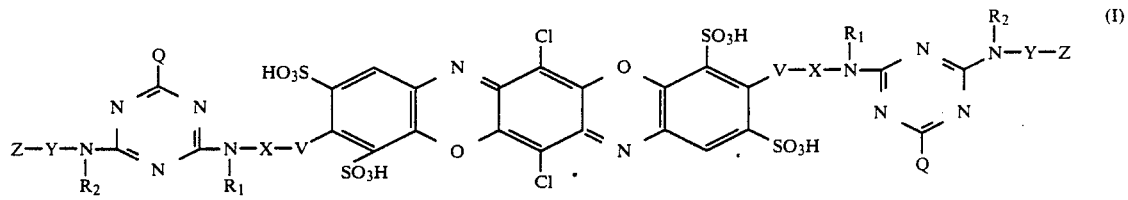 (I)

wherein V is a direct linkage or

in which $R_3$ is hydrogen or unsubstituted or substituted alkyl, and X is a direct linkage or an aliphatic, araliphatic or aromatic bridging group, provided that X stands for the bridging group as defined hereinabove when V is

Y is unsubstituted or substituted phenylene, or unsubstituted or substituted naphthylene, Z is —$SO_2CH=CH_2$ or —$SO_2CH_2CH_2Z_1$ in which $Z_1$ is a group capable of being split by the action of an alkali, Q is sulfo, hydroxy, halo, alkoxy, unsubstituted or substituted phenoxy or unsubstituted or substituted amino, and $R_1$ and $R_2$ independently of one another are each hydrogen or unsubstituted or substituted alkyl.

4. The dioxazine compound according to claim 3, wherein V is a direct linkage or —NH—.

5. The dioxazine compound according to claim 3, phenylamino, 3,6-disulfonaphthyl-(1)-amino, 3,6,8-trisulfonaphthyl-(1)amino, 4,8-disulfonaphthyl-(2)-amino, 3,6,8-trisulfonaphthyl-(2)-amino or morpholino.

10. The dioxazine compound according to claim 3, which is represented by the following formula in the free acid form,

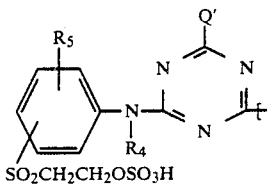 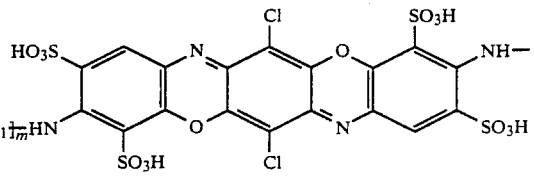

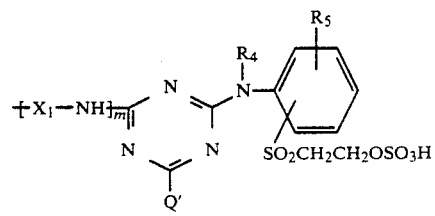

wherein X is a direct linkage, ethylene, propylene or phenylene unsubstituted or substituted once or twice by sulfo.

6. The dioxazine compound according to claim 3, wherein $R_1$ and $R_2$ independently of one another are each hydrogen, methyl or ethyl.

7. The dioxazine compound according to claim 3, wherein Y is phenylene unsubstituted or substituted once or twice by methyl, ethyl, methoxy, ethoxy, chloro, bromo, sulfo or carboxy, or naphthylene unsubstituted or substituted one by sulfo.

8. The dioxazine compound according to claim 3, wherein Q is alkoxy having 1 to 4 carbon atoms or unsubstituted or substituted amino.

9. The dioxazine compound according to claim 3, wherein the unsubstituted or substituted amino is amino, carboxymethylamino, N,N-dihydroxymethylamino, ethylamino, βcarboxyethylamino, β-hydroxyethylamino, β-methoxyethylamino, β-sulfoethylamino, N-(β-sulfoethyl)-N-methylamino, N,N-diethylamino, N,N-di-β-hydroxyethylamino, phenylamino, N-ethyl-N-phenylamino, toluidino, anisidino, 2-, 3- or 4-sulfoanilino, 2,4- or 2,5-disulfoanilino, 2-carboxy-5-sulfowherein Q' is unsubstituted or substituted amino, $X_1$ is ethylene, propylene or sulfophenylene, $R_4$ is hydrogen, methoxy or ethyl, $R_5$ is hydrogen, methyl, methoxy or sulfo, and m is 0 to 1.

11. The dioxazine compound according to claim 10 wherein the unsubstituted or substituted amino is amino, carboxymethylamino, N,N-dihydroxymethylamino, ethylamino, β-carboxyethylamino, β-hydroxyethylamino, β-methoxyethylamino, β-sulfoethylamino, N-(β-sulfoethyl)-N-methylamino, N,N-diethylamino, N,N-di-β-hydroxyethylamino, phenylamino, N-ethyl-N-phenylamino, toluidino, anisidino, 2-, 3- or 4-sulfoanilino, 2,4-or 2,5-disulfoanilino, 2-carboxy-5-sulfophenylamino, 3,6-disulfonaphthyl-(1)-amino, 3,6,8-trisulfonaphthyl-(1)-amino, 4,8-disulfonaphthyl-(2)-amino, 3,6,8-trisulfonaphthyl-(2)-amino or morpholino.

12. The dioxazine compound according to claim 3 wherein the unsubstituted or substituted phenoxy is phenoxy which is unsubstituted or substituted once or twice by chloro, bromo, methyl, ethyl, methoxy, ethoxy, sulfo or carboxy.

* * * * *